June 9, 1964          H. FROESE          3,136,463
ATTACHMENT FOR MICROFILM FLOW TYPE CAMERAS
Filed April 2, 1962          2 Sheets-Sheet 1
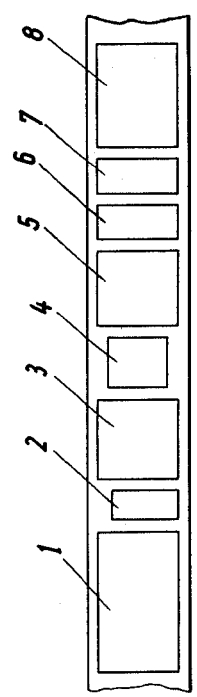
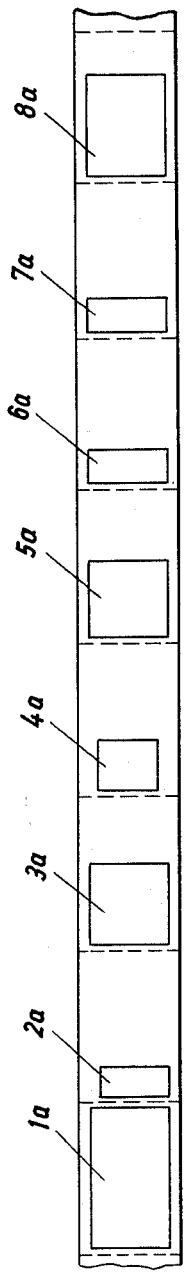
Inventor:
HERBERT FROESE
by
Arthur O. Klein
Attorney June 9, 1964          H. FROESE          3,136,463

ATTACHMENT FOR MICROFILM FLOW TYPE CAMERAS

Filed April 2, 1962          2 Sheets-Sheet 2

*Inventor:*
HERBERT FROESE
by: *Arthur O. Klein*
     *Attorney*

United States Patent Office 3,136,463
Patented June 9, 1964

3,136,463
ATTACHMENT FOR MICROFILM FLOW TYPE CAMERAS

Herbert Froese, Berlin, Germany, assignor to Photo Copie G.m.b.H., Berlin, Germany
Filed Apr. 2, 1962, Ser. No. 186,594
Claims priority, application Germany Mar. 30, 1960
6 Claims. (Cl. 226—24)

The present application is a continuation-in-part of my copending patent application Serial No. 98,174, filed May 24, 1961, now abandoned.

This invention relates generally to microfilm flow type cameras, and more particularly to microfilm flow type cameras adapted to reproduce blueprints, drawings, documents, etc. inserted into the feed entrance of the machine on a belt type emulsion carrier.

In flow type microfilm cameras of the above described character the sheet that is to be photographed moves through the camera in one direction and the belt type emulsion carrier on which the image of the sheet is going to be reproduced moves in the opposite direction. The belt type emulsion carrier moves only through the camera as long as the sheet remains under the light exposure beam, so that a short sheet will cause a short movement of the emulson carrier and will render a short reproduction on the emulsion carrier and a long sheet will cause a long movement and render a long reproduction on the emulsion carrier. Therefore, the underlying principle of the known microfilm flow type camera consists of using an amount of the emulsion carrier that is proportional to the length of the sheet to be reproduced, so that when sheets of different length are inserted into the camera, negative reproductions of different sizes will appear sequentially on the emulsion carrier in the same order in which the aforesaid sheets were inserted into the camera. In contradistinction thereto, the size of negatives of a discontinuous ordinary camera are constant and independent from the size of the subject matter that is to be reproduced.

It is however, desirable for certain industrial purposes to obtain a series of reproductions of equal size, which has heretofore been impossible to obtain with the known flow type camera.

The need for a camera that renders reproductions of equal size becomes evident when one considers that when the developed belt type emulsion carrier is cut after removing it from the camera separate reproductions of equal width but different length are obtained.

It is therefore an object of this invention to provide a known type of flow camera with an attachment that enables that camera to furnish negatives of equal size regardless of the size of the subject matter that is being reproduced.

In the known type of flow cameras the run of the sheet that is to be reproduced corresponds generally in length to the run of the emulsion carrier. The attachment forming part of this invention causes the emulsion carrier to continue the run after the run of the sheet that is to be reproduced has been completed and automatically stops the emulsion carried only at a pre-selected point. The delay action of the stopping of the run of the emulsion carrier can be effected by a drum or cone which cooperates with an electrical contact finger that abuts thereagainst. The arrangement and construction of the contact finger and drum or cone is such that an adjustment of either one with respect to the other regulates the delay action of the stopping of the running of the emulsion carrier. In an alternate embodiment of this invention, the delay action of the stopping of the running of the emusion carrier is effected by a time-delay relay.

When the attachment of this invention is switched on, the action of the cutout switch which normally automatically stops the driving means for the belt-type emulsion carrier after the photographing of the sheet has been completed, is suspended for a pre-selected period of time by the attachment of this invention. The suspension of the action of the cutout switch lasts as long as the driving means for the belt-type emulsion carrier continue to be energized due to electrical contact of the indexing cone or drum and the contact finger or by the action of the time-delay relay. The attachment of this invention is provided with acoustical or visual means that indicate to a person servicing the camera whether the attachment has been turned on or off and whether it is in operation.

The novel features which are considered as characteristic for the invention are set forth in particular in the appended claims. The invention itself, however, both as to its construction and its method of operation, together with additional objects and advantages thereof, will be best understood from the following description when read in connection with the accompanying drawings in which:

FIG. 1 is a plan view of a belt-type emulsion carrier as it appears after it has been exposed while running through a flow-type camera without the attachment forming part of this invention being in operation;

FIG. 2 is a plan view of another belt-type emulsion carrier as it appears after it has been exposed while running through a flow-type camera with the attachment forming part of this invention being in operation;

Figure 3:
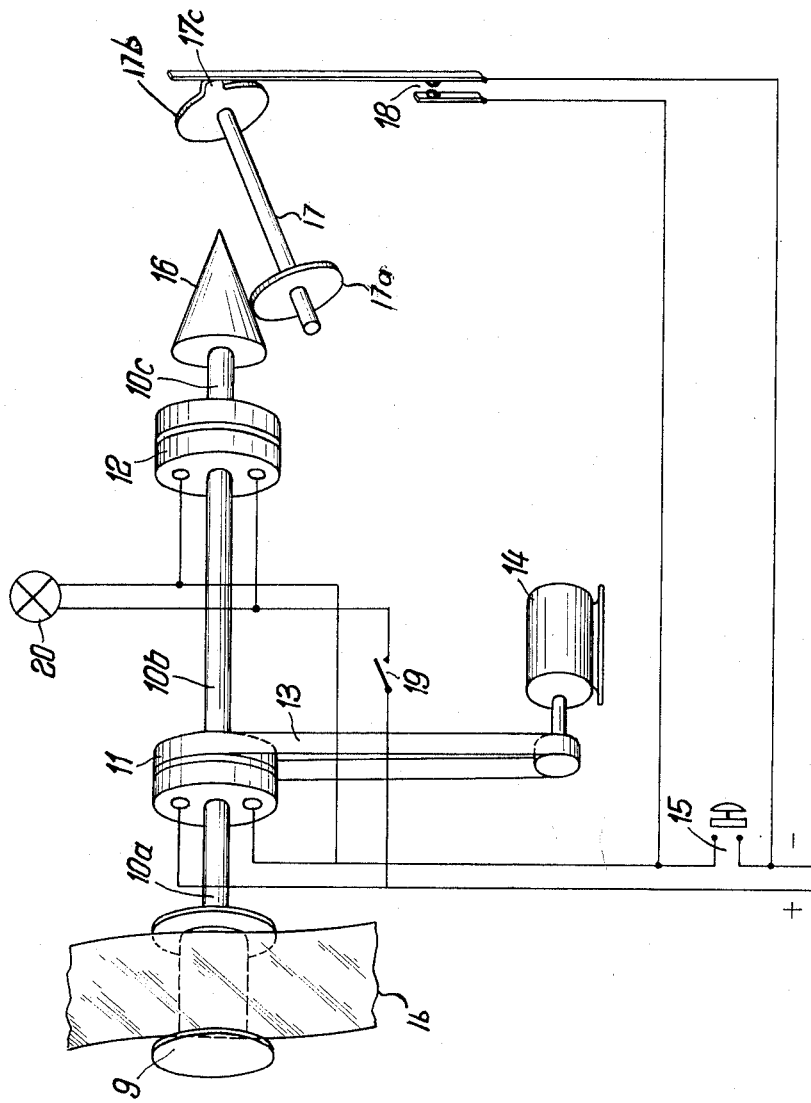
FIG. 3 is a schematic illustration of one embodiment of the attachment forming part of this invention.

Referring now to the drawings, in FIG. 1 the photographic reproductions are designated by numerals, 1, 2, 3, 4, 5, 6, 7, 8. These reproductions are contiguous to each other despite the fact that they are of different sizes. The photographic reproductions of FIG. 2 which are designated by the numerals 1a, 2a, 3a, 4a, 5a, 6a, 7a, and 8a, are identical in size to the photographic reproductions of FIG. 1 and are continuously located on the same size portions of the emulsion carrier 1b as can be noted from FIG. 2. The photographic reproductions 1a, 2a, 3a, 4a, 5a, 6a, 7a and 8a are always located at the beginning of each of the cut portions of the emulsion carrier 1b. The distance between the end of the photographic reproductions and the end of the cut portions of the emulsion carrier 1b depends, of course, on the size of the former. For instance, the photograph 1a fills practically the entire portions of the emulsion carrier 1b, whereas the photographic reproduction 2a fills only about a ¼ of the portion of the emulsion carrier 1b and the photographic reproduction 3a somewhat more than half, etc.

The attachment forming part of this invention comprises a switch 19 in an electrical circuit as illustrated in FIG. 3. A continuously rotating motor 14 drives the rotatably supported shaft 10a, 10b, 10c by means of a belt 13. Two magnetic coupling devices 11 and 12 are axially arranged on the shaft 10a, 10b, 10c, as illustrated in FIG. 3. When the photocell relay 15 is energized due to the introduction of a sheet that is to be reproduced into the camera, the energizing circuit for the magnetic coupling device 11 is closed and shaft 10a thereby begins to be driven by motor 14 via belt 13 and magnetic coupling device 11. In the event switch 19 is closed, the magnetic coupling device 12 is also energized when photocell relay 15 is energized. The cone 16 which is axially secured to shaft 10a is then also driven by motor 14 via belt 13, shaft 10b, magnetic coupling device 12 and shaft 10c. The cone 16 drives a wheel 17a which frictionally abuts thereagainst. Wheel 17a is axially secured to one end of the shaft 17 and a second wheel 17b is axially secured to the opposite end thereof. The shaft 17 has a constructional supporting arrangement not forming part of this invention by means of which the wheel 17a may be manually axially displaced along the convolute surface of the cone 16 without breaking the frictional contact between the cone 16 and the wheel 17a. By means of this constructional supporting arrangement the rotary speed of the unit 17, 17a, 17b can be manually adjusted. For instance, when wheel 17a is placed near the base of the cone 16, the wheel 17a will be rotated faster than when the wheel 17a is placed near the apex of the cone 16.

Wheel 17b is provided with a cam surface 17c which causes a switch 18 to open when it comes into abutting contact therewith. The switch 18 is in a circuit which bridges over the photocell relay 15, so that when switch 18 is opened, the bridging energizing circuit for the magnetic coupling devices 11 and 12, that continued to energize the latter two devices despite the de-energization of the photocell relay 15, is now broken as well. It will therefore be noted that when switch 19 is closed and photocell relay 15 is deenergized after, for example, a short sheet that is to be reproduced has passed through the microfilm flow type camera, the motor 14 will continue to drive the emulsion carrier 1b through the camera via a driving drum 9, shaft 10a, magnetic coupling device 11 and belt 13, until switch 18 is opened by cam 17c. By means of this novel arrangement of applicant it is therefore possible to adjust the length of the run of the driving drum 9 by means of the time switch 16, 17, 18 independently from the activity of the photocell relay 15 circuit. This can be done by merely closing switch 19 and manually adjusting wheel 17a with respect to cone 16. A light signal or acoustical signal 20 is arranged in the energizing circuit of the magnetic coupling device 12 so that a bulb lights up or a buzzer or the like emits a sound as long as cone 16 and therefore also driving drum 9 rotate. In this manner, a person servicing the camera is prevented from introducing a new sheet that is to be reproduced until the predetermined run of the emulsion carrier 1b along driving drum 9 has been completed. Other arrangements for preventing the introduction of a new sheet are also intended to be within the scope of this invention. For instance, an electro-magnetically movable locking board may be operatively mounted at the entrance slit of the camera (not shown) as long as driving drum 9 and cone 16 rotate.

FIG. 3 of the drawing illustrates one embodiment 16, 17, 18 of a time switch. It is, however, within the scope of this invention to provide other time switches which can perform the same function as the time switch illustrated in FIG. 3.

When the microfilm camera is to be returned to normal operation, i.e., reproduction of sheets proportional to the lengths thereof rather than of equal length, the switch 19 is opened. The energizing of magnetic coupling 12 is thereby interrupted and the rotation of cone 16, wheel 17a, wheel 17b and cam 17c stops. Coupling 11, however, continues to be energized by the photocell relay 15 when a sheet is introduced into the camera and is deenergized by photocell relay 15 as soon as the sheet leaves the camera.

The attachment according to this invention operates as follows:

A contact switch 19 is manually adjusted, which switches on the attachment of this invention. A photocell 15 in the camera is operatively connected to a cut-out switch and usually effects a stopping of the transport mechanism 9 when the object that is to be reproduced has completed its pass under the light exposure beam. The attachment of this invention is of such operation and construction that although the transport mechanism 9 of the emulsion carrier is activated when the sheet that is to be reproduced enters the light exposure beam, the transport mechanism, however, does not end but continues to run for a predetermined period of time after the sheet to be reproduced has completely passed the light exposure beam. This delay action of the cut-out switch is effected in the embodiment of this invention by an indexing disc or cone 16 which is rigidly secured to a transport mechanism 9 of the emulsion carrier by magnetic coupling devices 11 and 12. The length of the run of the emulsion carrier through the camera is, therefore, adjustable within the limits of the periphery of the cone 16. In an alternate embodiment of this invention, the delay action which temporarily deenergizes the cut-out switch is effected by a time-delay relay electrically connected thereto.

The time-delay relay is energized when the object to be reproduced enters the light beam. This relay is only deenergized after a pre-selected period of time which can be adjusted, and, thereby the running motion of the attachment mechanism is stopped. The switching on and off of the transport mechanism is visually indicated by a single light or other optical means 20 which facilitates the adjusting of the transport mechanism 9 and attachment by a person servicing the same. It is not without the scope of this invention to provide instead of optical signalling means acoustical signalling means. The energizing circuit for the signalling means is closed by the same contact which activates the attachment forming part of this invention.

One of the principal advantages of the attachment in accordance with this invention lies in the fact that it enables a standard flow type camera to provide cut photographic reproductions of equal size regardless of the size of the object that has been reproduced. The need of a device of this character becomes apparent when one considers that to assemble sheets of different sizes in a stack or the like is quite difficult. The device of this invention enables, however, a flow-type camera which normally reproduces only photographs on different size sheets to reproduce the same photographs on identical sheets by the mere flicking of a contact or switch. Furthermore, the adjusting of the flow-type camera to perform one or the other operation, i.e., furnish photographs on different size sheets or identical sheets, can be accomplished in a minimum of time and without the exchanging of films or substantial structural alterations of the camera.

It is obvious that the length of the object to be reproduced cannot exceed the length of one cut portion of the belt-type emulsion carrier. The maximum length of the cut portion of the emulsion carrier is limited by the perimeter of the contact disc or cone 16, or the maximum time that the time delay may be set for. In practice, the lengths of the cut portions of the emulsion carrier are adjusted to correspond to the common length of the greatest number of objects to be reproduced or, on the other hand, are adjusted according to a specific length of the cut portions of the emulsion carrier that is desired.

Although the present invention has been described in conjunction with preferred embodiments, it is to be understood that modifications and variations may be resorted to without departing from the spirit and scope of this invention, as those skilled in the art will readily understand. Such modifications and variations are considered to be within the purview and scope of the invention and appended claims.

What I claim is:

1. An attachment for a camera adapted to photographically reproduce drawings, blueprints, documents and the like on belt-type emulsion carriers through which the emulsion carrier and sheet to be reproduced travel approximately the same distance, comprising in combination, a shaft rotatably mounted in said camera, a motor continuously driving said shaft, a belt drive cylinder rotatably supported in said camera coaxially with said shaft, first electromagnetic coupling means operatively mounted on said shaft and serving to selectively couple said shaft and said belt drive cylinder, time switch means rotatably supported in said camera coaxially with said shaft, second electromagnetic coupling means mounted on said shaft and serving to selectively couple said shaft and said time-switch means, a photocell relay for actuating and deactuating said first electromagnetic coupling means electrically connected thereto, an electric circuit bridging said photocell relay, and an electric contact switch in said electric circuit and operatively connected to said time-switch means.

2. The attachment as set forth in claim 1, wherein said time-switch means comprise a cone, wheel means abutting against said cone and slidably mounted in said camera, and wherein said contact switch comprises a portion in abutting contact with said wheel means.

3. The attachment as set forth in claim 1, including electric signalling means in an electric circuit connecting said photocell relay and first and second electromagnetic coupling means, and a switch in said electric circuit for electrically connecting or disconnecting said attachment and electric signalling means.

4. An attachment for a camera adapted to photographically reproduce drawings, blueprints, documents and the like on belt-type emulsion carriers in which the emulsion carrier and sheet to be reproduced are moved approximately the same distance by an electric motor, comprising in combination, a belt drive cylinder for transporting said emulsion carrier through said camera rotatably mounted in said camera, electric motor means mounted in said camera, a drive shaft rotatably mounted in said camera and operatively connected to said electric motor means, time switch means rotatably supported in said camera, first and second electromagnetic coupling means operatively mounted on said shaft and serving to respectively selectively couple said belt drive cylinder and time switch means to said drive shaft, and a photocell relay in the electric circuits of said first and second electromagnetic coupling means, whereby when said photocell relay is activated by a drawing to be photographically reproduced that is introduced into said camera said electric circuits of said first and second electromagnetic coupling means are selectively closed and said belt drive cylinder and time switch means are thereby selectively driven respectively via said first and second electromagnetic coupling means and drive shaft by said electric motor means.

5. The attachment as set forth in claim 4, including a switch in the electric circuit of said second electro-magnetic coupling means for selectively electrically connecting the latter means to said photocell relay.

6. The attachment as set forth in claim 4, including electric signalling means in the circuit of said second electro-magnetic coupling means.

References Cited in the file of this patent
UNITED STATES PATENTS

| | | |
|---|---|---|
| 2,578,037 | Berlant | Dec. 11, 1951 |
| 2,592,735 | Pirmov | Apr. 15, 1952 |
| 2,627,203 | Hessert | Feb. 3, 1953 |
| 2,664,782 | Weninger | Jan. 5, 1954 |

UNITED STATES PATENT OFFICE
CERTIFICATE OF CORRECTION

Patent No. 3,136,463 June 9, 1964

Herbert Froese

It is hereby certified that error appears in the above numbered patent requiring correction and that the said Letters Patent should read as corrected below.

Column 1, line 11, for "May" read -- March --.

Signed and sealed this 16th day of March 1965.

(SEAL)
Attest:

ERNEST W. SWIDER
Attesting Officer

EDWARD J. BRENNER
Commissioner of Patents